United States Patent Office 3,421,202
Patented Jan. 14, 1969

3,421,202
PROCESS FOR JOINING METALS AND CERAMICS HAVING GROSSLY DIFFERENT COEFFICIENTS OF THERMAL EXPANSION
William T. Kaarlela, Fort Worth, Tex., assignor to General Dynamics Corporation, Fort Worth, Tex., a corporation of Delaware
No Drawing. Continuation-in-part of application Ser. No. 183,378, Mar. 29, 1962. This application Nov. 4, 1964, Ser. No. 408,749
U.S. Cl. 29—473.1     3 Claims
Int. Cl. B23k 31/02

ABSTRACT OF THE DISCLOSURE

A process for joining castable, hard, fine-grained ceramic materials to metals which have grossly different coefficients of thermal expansion relative to the ceramic to achieve both good bonds and to prevent cracking of the ceramic or resultant joint by high temperatures or cycling of temperatures, the critical range of the brazing alloy being from 30% to 70% by weight silver, 0.5% to 3.0% by weight lithium and the balance zirconium or titanium. The ceramic and metal are brazed at about 2300° F. but below 2350° F., preferably in an argon atmosphere. The ranges of constituents are critical in that if the titanium or zirconium are below 30% by weight ceramic cracking results, if above 70% by weight adhesion is unsuitable.

---

This application is a continuation-in-part of application Ser. No. 183,378, filed Mar. 29, 1962, now abandoned.

This invention relates in general to the joining of metals and ceramics.

More particularly, the invention relates to a brazing alloy and process to effect joining of metals and ceramics having substantially different coefficients of thermal expansion.

Development of high speed aerospace craft has required the utilization of new materials to withstand the high surface temperatures encountered as a result of aerodynamic heating. Among the best and most promising materials developed to meet this need are the hard, fine-grained, castable ceramics, usually formed from glass, due to their excellent suitability to high temperature applications.

However, a major difficulty in the use of such materials has been the difficulty of achieving satisfactory joinder of these ceramics, which inherently have a relatively low coefficient of thermal expansion (i.e., from about $-7 \times 10^7$ to about $55 \times 10^7$), to the metal structure with its substantially relatively higher coefficient of thermal expansion, with the resultant joint capable of withstanding the high temperatures requisite.

It is accordingly an object of this invention to provide a brazing alloy and a process for the joining of hard, fine-grained crystalline ceramics to metals which will permit maximum utilization of such ceramics by accomplishing their joinder to a wide variety of metals.

It is a further object of this invention to provide a brazing alloy and a process for joining metals to castable ceramics having low coefficients of thermal expansion which is productive of strong ceramic-to-metal joints capable of withstanding high temperatures.

Other objects and advantages of this invention will become apparent from the following detailed description.

The brazing alloy and process of this invention has been found excellent, for example, for effecting the joider of metal with the glass ceramic developed by the Corning Glass Works under their trademark "Pyroceram." This material, described in detail in U.S. Patent 2,920,-971, possesses high strength, hardness and abrasion resistance and is characterized by uniform electrical properties at microwave frequencies and elevated temperatures. The obvious advantages inherent in such a material where extreme heating and/or electrical characteristics are of significant import, and the advantages to be derived by the ability to reliably join it to metals, are most important to the aerospace and electronics industries, wherein such a need has been long felt.

Incorporated as constituent ingredients in the brazing alloy of the present invention, in the specific by weight proportions indicated, are silver, and one or both of zirconium or titanium. The latter two elements preferably enter into the formulation in the hydride form. Lithium, as hereinafter explained in detail, may be an optional ingredient of the alloy.

It is of extreme importance in the practice of the invention, that the brazing alloy possess thermal expansion characteristics compatible with the ceramic with which it is to be joined, and that the brazing alloy provide adequate wetting action. The thermal expansion characteristics are variable only by proportioning the alloy ingredients within the ranges carefully enumerated in the percent-by-weight below. The wetting action of the alloy may be improved if the hydrides of zirconium or titanium are used in preference to incorporation thereof in substantially pure form. Since the hydrogen is dissociated from the zirconium or titanium during the alloying process, only the zirconium or titanium remains as an element of the brazing alloy.

The addition of lithium to the brazing alloy in the percent-by-weight ranges specifically set forth promotes flow and wetting action, but use of lithium is limited by the oxidation effect lithium has on certain metals, such as molybdenum, columbium, and titanium and should not be used therewith because all are subject to excessive oxidation. Other metals, such as nickel, chromium or iron-based alloys, do not present such a problem and lithium provides good results when used with these metals.

The preferred method for formulating the alloy is to mix in the proper proportions specified below pure silver in powder form with zirconium hydride or titanium hydride, similarly in powder form. However, satisfactory results are obtained in either instance and the invention is not to be construed as limited to the use of one or the other form. After the powder form ingredients have been suitable physically mixed in appropriate proportions, they are preplaced on the joints and then brazed.

The brazing process is preferably accomplished at a temperature of about 2300° F. and should, in any event, be accomplished below 2350° F. to avoid excessive flow. In order to minimize contamination during brazing, an argon atmosphere may be used.

The range of ingredients in percent-by-weight for the process described is as follows:

Range A

| | |
|---|---|
| Silver _____percent__ | 30–70 |
| Zirconium or titanium _____ | Balance |

Range B

| | |
|---|---|
| Silver _____percent__ | 30–70 |
| Lithium _____do____ | 0.5 to 3.0 |
| Zirconium or titanium _____ | Balance |

The above upper and lower range limits are extremely important as previously noted in that a variation of ingredient proportions outside the indicated limits will result in an unsatisfactory alloy. Where the constitutent titanium or zirconium falls below the critical percentages specifically set forth, the resultant alloy is useless for joining ceramics having low coefficients of thermal expansion relative to the metal due to ceramic cracking as a result of thermal cycling, that is stresses resultant from heating and cooling. Where above the critical percentage, the alloy is rendered unsuitable for its intended use due to poor adhesion.

Within the above preferred ranges, superior results have been obtained with two alloy compositions. The alloy ingredients, in percent by weight, were specifically proportioned as follows:

Composition A

| | |
|---|---|
| Silver _____percent__ | 55 |
| Zirconium _____ | Balance |

Composition B

| | |
|---|---|
| Silver _____ | Balance |
| Zirconium _____percent__ | 45 |
| Lithium _____do____ | 0.5 |

I claim:
1. A process for making joints between a hard, fine-grained castable ceramic having a coefficient of thermal expansion in the range of $-7 \times 10^7$ to $55 \times 10^7$ and a metal having a grossly different coefficient of thermal expansion which comprises brazing said ceramic and metal at a temperature of about 2300° F. but below 2350° F. with an alloy consisting of from 30% to 70% by weight of silver, from 0.5% to 3.0% by weight of lithium as a wetting agent, and the balance of at least one member selected from the group consisting of zirconium and titanium.

2. The process as defined in claim 1 wherein said alloy consists essentially of 45% by weight of zirconium, 0.5% by weight of lithium, and the balance silver.

3. A process for making joints between a hard, fine-grained castable ceramic having a coefficient of thermal expansion in the range of $-7 \times 10^7$ to $55 \times 10^7$ and a metal having a grossly different coefficient of thermal expansion which comprises brazing said ceramic and metal at a temperature above the melting point of the brazing alloy, the alloy consisting of from 30% to 70% by weight of silver and the balance of at least one member selected from the group consisting of zirconium and titanium.

References Cited

UNITED STATES PATENTS

| | | | |
|---|---|---|---|
| 2,820,534 | 1/1958 | Hume _____ | 29—504 |
| 3,159,481 | 12/1964 | Horrigan et al. | 75—173 |

OTHER REFERENCES

Ceramic Age, High Temperature Metal Ceramic Seals, by H. Bender; April 1954; pp. 48 and 49.

M.I.T. Research Laboratory of Electronics, Technical Report #104, by C. S. Pearsall et al., Metal to Nonmetallic Brazing, Apr. 5, 1949; pp. 4–6.

JOHN F. CAMPBELL, *Primary Examiner.*

U.S. Cl. X.R.

29—504